July 3, 1928.
W. McKEE
HOT BED
1,675,949
Original Filed Oct. 22, 1925  2 Sheets-Sheet 1
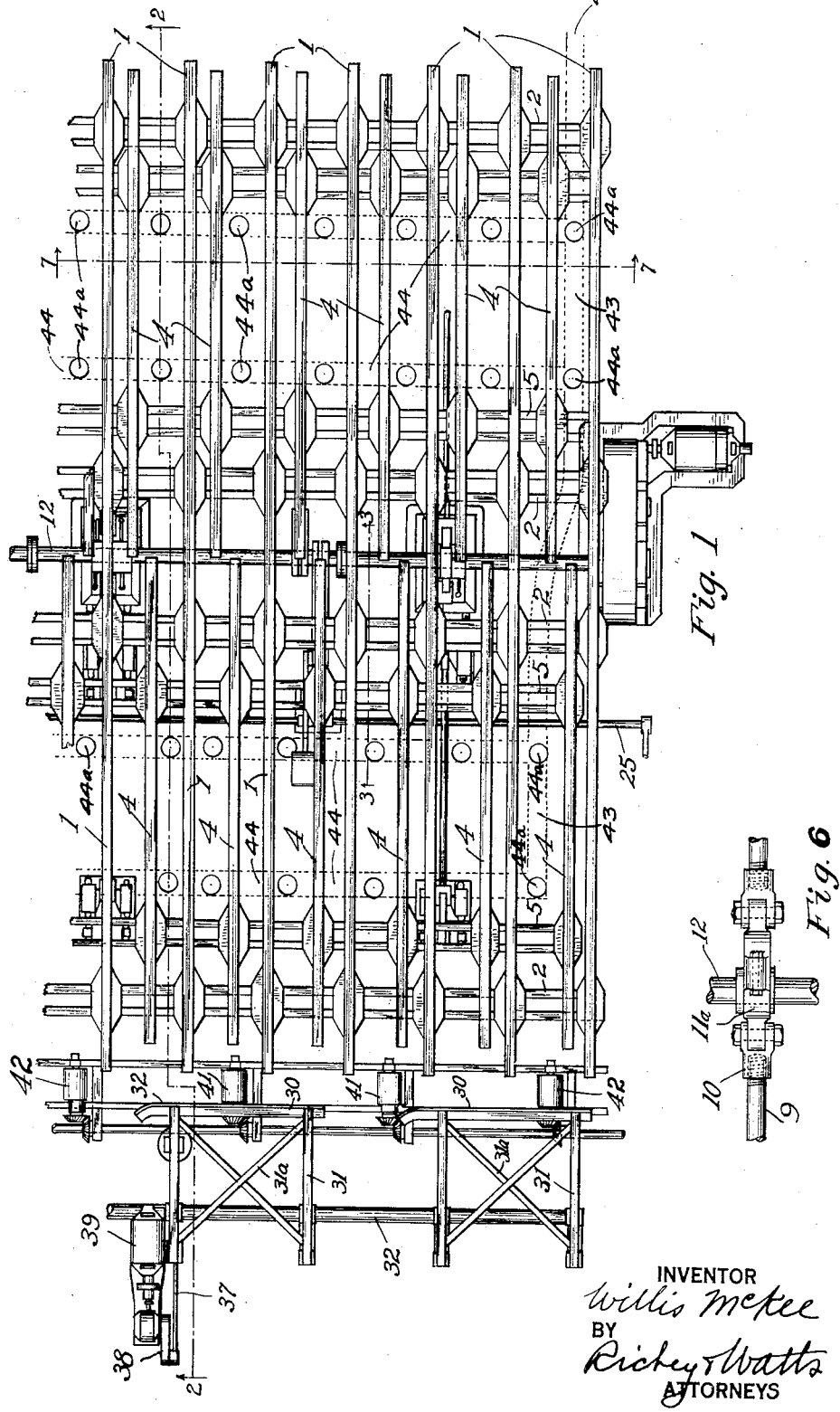
INVENTOR
Willis McKee
BY
Rickey & Watts
ATTORNEYS July 3, 1928.  W. McKEE  1,675,949
HOT BED
Original Filed Oct. 22, 1925  2 Sheets-Sheet 2
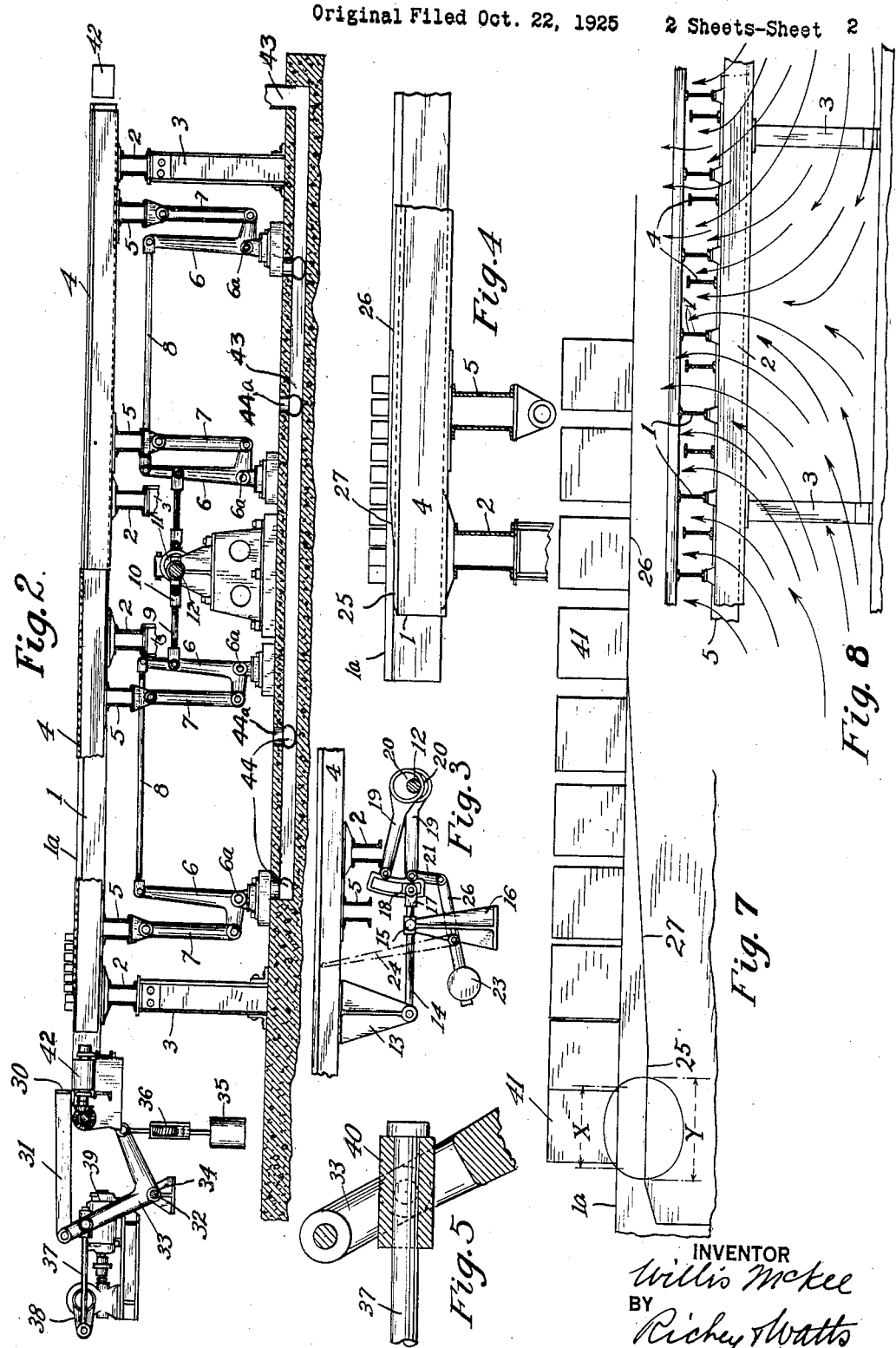
INVENTOR
Willis McKee
BY
Richey & Watts
ATTORNEYS Patented July 3, 1928.

1,675,949

UNITED STATES PATENT OFFICE.

WILLIS McKEE, OF CLEVELAND, OHIO, ASSIGNOR TO CENTRAL NATIONAL BANK OF CLEVELAND, OF CLEVELAND, OHIO, A CORPORATION OF OHIO.

HOTBED.

Application filed October 22, 1925, Serial No. 64,194. Renewed May 28, 1928.

This invention relates to hot beds and to the art of cooling elongated heated articles. It is particularly concerned with an improved and expeditious method of cooling elongated metallic articles from high temperatures and with apparatus for practicing such method and conveying such articles through a cooling zone.

Apparatus embodying my present invention resembles, in certain respects, apparatus of which I was joint or sole inventor and which is described in U. S. Letters Patents No. 754,229, issued March 8th, 1904; No. 771,438, issued October 4th, 1904 and No. 1,486,984, issued March 18th, 1924, and also resembles, in certain respects, apparatus disclosed in my copending application, Serial No. 668,890, filed October 16th, 1923. In the apparatus of the foregoing patents and application, it was impossible automatically to space the work blanks or heated articles apart from each other distances which are a given percentage of the widths of the articles and then maintain such spacing for the remainder of their travel through the cooling zone. It is desirable, under certain conditions, to accomplish such separation and to maintain distances between adjacent work blanks, which are preferably a predetermined percentage of the horizontal width of the particular articles being conveyed and cooled. One important advantage of such separation is that a new and improved method of cooling the articles may be practiced. Accordingly, one important object of my invention is to construct a hot bed in which the distance between adjacent work blanks may be changed automatically by a given percentage of the width of one of the articles and then maintained constant.

In the apparatus of the above mentioned patents and application, the work blanks were delivered to the stationary members by positively actuated means which did not require very close adjustment or accurate control of the speed or length of travel thereof. For practicing my improved method of cooling, however, it is desirable that the work blanks be delivered to the stationary members with not more than a predetermined force nor beyond a predetermined position. Accordingly, another object of my invention is to construct adjustable feeding apparatus for delivering elongated work blanks with any predetermined force onto the stationary members of a hot bed.

Other objects and advantages will appear and be pointed out in the following specification and illustrated in the drawings, in which one form of apparatus embodying and for use in practicing my invention is shown, in which:

Fig. 1 is a top plan view of a hot bed embodying my invention;

Fig. 2 is a side view, partly in section, taken on line 2—2 of Fig. 1;

Fig. 3 is a side view, partly in section, taken on line 3—3 of Fig. 1;

Fig. 4 is an enlarged, fragmentary view of the receiving end of the hot bed onto which work blanks are delivered;

Fig. 5 is a fragmentary view, partly in section, of a portion of the feeding device;

Fig. 6 is an enlarged, fragmentary view showing parts of the driving mechanism;

Fig. 7 is a diagrammatic view illustrating the manner in which the distance between adjacent articles on the hot bed is varied and the manner of accomplishing this variation; and Fig. 8 is a diagrammatic view showing the flow of cooling fluid through the illustrated apparatus according to my invention.

In the drawings, the stationary members 1 are secured to cross members 2, carried on suitable foundations 3. These members 1 constitute supports along which articles or work blanks may be moved from one end to the other thereof, the members 1 all being arranged with their top surfaces in substantially the same horizontal plane. Movable members 4 cooperate with the stationary members for moving the articles along the stationary members. I preferably form these movable members 4 of such length that two or more of these members arranged end to end are substantially equivalent in length to the length of a single stationary member 1. As shown in the drawings, the movable members 4 are preferably arranged and connected in sets by cross members 5 so as to function as units, one set extending from adjacent to the receiving end of the stationary members 1 and overlapping with the next set. Obviously a single set or more than two sets of movable members may be employed if and when desired.

The members 4 of each set have top surfaces arranged in one or more planes substantially parallel to the plane of the top surfaces 1ª of the stationary members 1. The members 4 are positioned for movement of their top surfaces in orbits above and below, the top surfaces 1ª, so as to carry the articles intermittently along the stationary members 1 from the receiving end thereof toward the delivery end thereof. When each set of members 4 are provided with two parallel top surfaces, these surfaces are arranged in different planes so that the axes of rotation parallel to the surface 1ª will lie one above the other, and the orbits will be parallel to each other. I prefer that the movable members shall move in a substantially elliptical orbit and accomplish this by apparatus including bell-cranks 6 which are connected at one end to the beams 5 by links 7 and at the other end to each other by a link 8. The two bell-cranks 6 thus move in unison and when pivoting about their pivot points 6ª serve to raise and lower the movable members of a set simultaneously and to the same extent. Means for moving the bell-cranks 6 about their pivot points 6ª includes a link 9 threaded right and left at opposite ends, a coupling 10 screw threaded thereto at one end and an eccentric strap 11ª hinged thereto and having bearing engagement with an eccentric 11 on drive shaft 12. As the shaft 12 rotates, the eccentric 11 reciprocates the link 9, thereby actuating the bell-cranks 6 about their pivot points 6ª and raising and lowering the moving members 4. The elevation of the orbit of the movable members with respect to the top surface 1ª of the stationary members may be varied by adjustment of the link 9, it being understood that when the effective distance from the drive shaft 12 to the adjacent bell-crank 6 is decreased, the elevation of the top surface of the members above the top surface 1ª, at the highest point of travel of the movable members, is correspondingly increased while an increase in the effective distance between the drive shaft 12 and the adjacent bell-crank 6 will correspondingly lower the movable members 4 and decrease the extent to which they may rise above the top surface 1ª of stationary members 1. Where two sets of movable members 4 are employed, as shown herein, each set can be similarly constructed. In Fig. 6 is shown an eccentric strap 11ª connected to two links 9 and engaging with one eccentric 11 to actuate the two sets of movable members from shaft 12. The sets as thus connected will counter-balance each other, that is, as one set is moving downwardly in its orbit, the other set will be moving upwardly in its orbit, thereby decreasing the energy required to actuate the two sets of movable members as will be understood by those skilled in the art.

To produce movement of the movable members in a direction of their length, I provide apparatus substantially as shown in Fig. 3, wherein a bracket 13, carried by the set of movable members, is attached to one end of a rod 14, which is mounted for reciprocation in a bearing 15 on a supporting member 16. The other end of the rod 14 carries a member 17 which engages within the arcuate shaped member 18 of a Stephenson link device, which device includes connecting rods 19 attached to either end of the member 18, each rod being shaped to receive an eccentric 20 mounted on and driven by a drive shaft which may be main shaft 12. Means for changing the location of member 18, with respect to member 17, comprises a link 21 joined to the member 18 and a lever 26 pivoted to the support 16 and counterweighted as at 23. A hand lever 24, operating through a shaft 25, serves to move the member 26 about its support and to vary the length of the stroke of the rod 14 and consequently of the movable members 4. Rotation of the shaft 12 is thus translated into reciprocating motion of the link 14 and movable members 4.

It will be understood that when the shaft 12 is rotating, both the links 10 and rod 14 will be reciprocating with the result that the movable members 4 will be given vertical and horizontal motions simultaneously resulting in travel in a substantially elliptical orbit.

With the members 17 and 18 in a neutral position, the travel of members 4 will be in substantially a vertical line, but by suitably adjusting members 17 and 18 the member 4 may be caused to travel either forward or backward in an elliptical orbit having a vertical axis the same length as the vertical line and a horizontal axis equal to the maximum throw of the link motion.

Referring particularly to Figs. 2, 4 and 7, it will be seen that the movable members 4 are provided, near the receiving end of the hot bed, with substantially horizontal surfaces 25 and 26 disposed in planes one above the other, connected by an inclined surface 27. The adjustment of the members 4 and spacing of surfaces 25 from surfaces 26 is such that both the surfaces 25 and 26 may move between levels above as well as below the top of the stationary members 1.

As will more clearly be understood by referring to Fig. 7, where the top surfaces 26 and the horizontal axis of rotation of the movable members coincide with the top surfaces 1ª of the stationary members, the length of horizontal travel of a given work blank 41 carried by the surfaces 25, which are disposed below surfaces 1ª, is represented by "X". The horizontal length of travel of the work blanks on surfaces 26 is represented by "Y". The "Y" dimension is approximately equal to the horizontal axis of the ellipse through which the movable members travel and represents the horizontal distance through which the articles 41 are moved during the movement of the surfaces 26 through one cycle. Inasmuch as the surfaces 25 are disposed below the surface 26, they will move about the surfaces 1ª only during less than half of their movement, this portion being represented by the dimension "X." Since the various parts of the surfaces 27 will move progressively varying distances above the top surfaces 1ª of the stationary members from a minimum at the junction with surfaces 25 to a maximum at its junction with surface 26, it naturally follows that articles carried thereby will be moved progressively greater longitudinal distances as they are carried by succeeding portions of the inclined surfaces 27. Consequently, articles delivered in side by side relation onto the surfaces 25 will be moved through progressively increasing distances as they are carried by surfaces 27, thus resulting in a progressively increasing distance between adjacent articles. That is, if a piece has a width equal to X then the space between adjacent pieces is equal to Y—X, and space between pieces of other widths will vary proportionally to their width.

Feeding apparatus for delivering articles or work blanks to the hot bed is shown in Figs. 1, 2 and 5, where 30 indicates a pusher connected by a suitable frame work, including bars 31 and braces 31ª, through a shaft 32, to a lever 33 pivoted as at 34 and secured at one end to the bars 31 and at the other end to a weight 35 with a shock absorbing spring 36 interposed between the weight and the lever. This lever 33 is positively actuated, in the direction to retract one or more of the pushers 30, by means of a rod 37 connected to a suitable crank arm 38, which arm may be actuated by a motor or other device 39, which rod 37 has a sliding or lost motion connection in a sleeve 40 pivotally carried by the arm 33. Movement of the rod 37 toward the left in Fig. 2 will pivot the arm 33 about its pivot arm 34, thereby retracting the pusher 30 positively. Movement of the rod 37 in the opposite direction permits pivoting of the arm 33 about its point 34 under the influence of the weight 35, the lost motion connection between sleeve 40 and rod 37 permitting this movement to be independent of that of the rod 37. By selecting weights 35 suitable for the different materials to be handled; and also by predetermining the desired length of travel of the weight 35, the speed of travel of the pusher 30 and the force with which it travels may be readily predetermined and adjusted. The pushers thus move work blanks 41 from conveyor rolls 42 on the stationary members 1 with sufficient force to carry them to, but not beyond, a predetermined point thereon. If the work blanks are delivered beyond the predetermined point on the stationary members, they may disarrange the spacing between adjacent articles already accomplished wholly or in part by the inclined surface 27 of the members 4. In other words, the force of the pusher with each different material to be handled will be so adjusted as not to be great enough to close up the articles after they are separated. I prefer to bevel the ends of the movable members 4, adjacent to the conveyor rolls 42, downwardly sufficiently far so that regardless of the adjustment of the movable members the receiving end thereof will never rise above the top surface of the stationary members 1.

I have shown two pushers 30 complete with their necessary parts, but it will be understood that a greater or less number of such pushers may be employed, the number being determined by the nature and size of the material to be delivered from the conveyor to the hot bed.

In cooling articles and particularly large metallic articles, such as steel rails, billets and the like, where the articles are transported through the cooling zone of a hot bed in substantially side to side contact, the cooling of the heated members, as practiced heretofore, has taken place very slowly. The cooling was accomplished largely by air that came into contact with the top of the articles. The air beneath the articles escaped but slowly so that the bottoms of the articles remained hot a long time. With the articles in side to side contact, little or no cooling of the sides was possible. The air drawn above the articles cooled the ends first and the middles last. The whole process was slow and the results not entirely satisfactory, since the resultant warpage was a disadvantage where the articles being cooled were in finished form. Moreover, the bed itself became highly heated and often warped. Where attempts were made to space the articles apart from each other the bed at once became inefficient with all articles except perhaps those of one certain width, due to the resulting unnecessary voids or unoccupied spaces on the bed or to improper spacing of the various sized articles on the bed.

In the operation of the apparatus, as described hereinabove, the heated work blanks of whatever width are automatically spaced apart from each other a predetermined percentage of the width of the blanks as they proceed into the cooling zone represented by the stationary members, thus insuring proper cooling of all blanks and avoiding unnecessary voids on the bed. This spacing induces a flow of air or other surrounding cooling fluid up beneath the hot bed and then up into contact with the bed and bottoms of the articles and between the articles, throughout the entire length of the heated articles, thereby cooling the bed and the bottoms, tops and sides of the articles more or less uniformly and from end to end, and much more rapidly than is otherwise possible. The cooling of the sides of the articles is controlled to a considerable extent by the spaces between the articles through which cooling gases pass. Since, by the construction of the bed, these spaces bear a constant ratio to the width of the articles, articles of various widths may be uniformly cooled without any alteration to the bed and without any loss of efficiency of the bed either as regards the nature of the cooling or the quantity of articles cooled. Additional cooling fluids may, if desired, be discharged beneath the members 1 as by one or more conduits 43 having branch conduits 44 and outlets 44ª, the conduit 43 being connected to a suitable source of such fluid (not shown). Any desired means may be employed to force cooling fluid through conduit 43, if needed.

It will be understood by those skilled in the art that I have provided a hot bed which will automatically space apart articles of various widths from adjacent articles a predetermined percentage of their widths so as to always obtain the most efficient cooling of the articles, and thereafter move the articles to the end of the hot bed without further change of the spacing between the articles. As a result, it is only necessary to deliver the articles of various widths to the hot bed in side by side contact for the hot bed will automatically space them apart the predetermined percentage of their width without any adjustment. This insures that the bed will always be filled with the maximum number of articles permissible with the maximum cooling, which means that the bed will be working at top capacity at all times regardless of the size of the articles delivered thereto. Moreover, my invention also results in a hot bed which is self-cooling as the separation of the articles creates a strong flow of air up through the articles and throughout the bed and in which, due to the fact that the articles are lifted and carried without friction, the article-supporting and carrying members may have correspondingly less contact surface thus allowing much less heating of the structure, and the cost of construction and operation of the bed correspondingly decreased without sacrificing strength or utility.

It will further appear that I have constructed a hot bed which is not only capable of inducing a natural draft of cooling gases between the articles which is automatically proportioned, to the width of the articles being cooled, but in which the natural flow of cooling gases may be accelerated at will throughout part or all of the hot bed.

It will be understood that when the heated articles have been suitably cooled they may again be brought closer to each other, if desired, by merely reversing the order of surfaces 25, 26 and 27 at the discharge end of the hot bed.

In Fig. 2 I have shown, at the right hand end thereof, a roller 45 corresponding to roller 42 previously mentioned and constituting a part of a conveyor onto which blanks delivered from the hot bed may be received and conducted away.

Having thus described my invention, what I desire to secure by Letters Patent is defined in what is claimed.

What is claimed is:

1. A conveyor comprising in combination stationary members for supporting work blanks, movable members for intermittently moving work blanks along the said stationary members, and means to actuate the movable members, the tops of the movable members being movable in two different parallel orbits one above the other.

2. In a hot bed in combination, stationary members for receiving work blanks, a conveyor for bringing work blanks adjacent to the receiving end of the stationary members, and a pusher for moving work blanks from the conveyor onto the stationary members, means for positively retracting the pusher, and means acting independently of the pusher retracting means for moving the pusher forward.

3. In a hot bed in combination, stationary members for receiving work blanks, a conveyor for bringing work blanks adjacent to the receiving end of the stationary members, and a pusher for moving work blanks from the conveyor onto the stationary members, means for positively retracting the pusher, and means acting independently of the pusher retracting means for exerting force on the pusher to move the same forwardly of the pusher.

4. In a hot bed in combination, a set of stationary, article-supporting members, means for delivering work blanks towards a predetermined point on the stationary members and with a given predetermined force and movable members cooperating with the stationary members to move articles along the latter intermittently, the movable members being adapted to vary the spacing between adjacent articles on the stationary member throughout only a part of the length of the movable members.

5. In a hot bed in combination, a set of stationary, article-supporting members, movable members cooperating with the stationary members to move articles along the latter intermittently, the movable members being adapted to vary the spacing between adjacent articles throughout only a part of the length of the movable members.

6. In a hot bed in combination, stationary members for supporting work blanks, and a set of movable members for moving work blanks along the stationary members, the said movable members cooperating with the stationary members in a manner to vary the distance between adjacent work blanks a given amount and thereafter to maintain the said distance substantially unchanged.

7. In a hot bed in combination, stationary members for supporting work blanks, a set of movable members for intermittently moving work blanks along the stationary members, the said movable members being provided with a plurality of surfaces parallel to the top surfaces of the said stationary members, and parallel to each other but disposed in different planes, and means for moving the top surfaces of the movable members through orbits, parts of which extend above the top surfaces of the stationary members.

8. In a hot bed in combination, stationary article-supporting members, means for moving the articles along the stationary members and for separating the articles from each other a predetermined percentage of the widths of the articles and means for discharging cooling fluid beneath the said articles.

9. In a hot bed in combination, stationary members for supporting work blanks, a set of movable members cooperating with the said stationary members for moving work blanks along the said stationary members, the said movable members being provided with top surfaces substantially parallel to the top surfaces of the stationary members and with other top surfaces inclined at an angle to the top surfaces of the stationary members.

10. In a hot bed in combination, stationary members for supporting work blanks, and a set of movable members for intermittently moving work blanks along the said stationary members, the said movable members being provided with substantially parallel top surfaces disposed in two different vertical planes and substantially parallel with the top surfaces of the stationary members, and being also provided with inclined top surfaces joining the two said parallel surfaces.

11. In a hot bed in combination, stationary members for supporting work blanks, a set of movable members for intermittently moving work blanks along the stationary members, the said movable members being provided with top surfaces substantially parallel to the top surfaces of the stationary members and with surfaces joining the said top surfaces and inclined thereto, and means for moving the top surfaces of the movable members through an orbit part of which extends above the top surfaces of the stationary members.

12. In a hot bed in combination, stationary members for supporting work blanks, means for delivering work blanks to the stationary members, and means for moving the work blanks along the stationary members and simultaneously therewith varying the spacing between adjacent work blanks to a predetermined percentage of the widths of the articles and thereafter continuing the movement of the blanks while maintaining the said spacing substantially unchanged.

13. In a hot bed in combination, stationary article-supporting members, means for delivering articles to be cooled to the said stationary members in substantially side by side engagement, and means for moving the articles along the stationary members and simultaneously therewith first spacing the articles apart from each other a distance which is a predetermined percentage of the width of the articles and then maintaining the said separation of the moving articles substantially unchanged.

14. In a hot bed in combination, stationary members for supporting work blanks, and movable members for intermittently moving work blanks along the stationary members, the said movable members having top surfaces disposed in two different planes, one of the said planes having the horizontal axis of its orbit or movement substantially in the plane of the top surface of the stationary members, the other plane having its corresponding horizontal axis spaced vertically from the top surface of the fixed support.

In testimony whereof I hereunto affix my signature this 20th day of October, 1925.

WILLIS McKEE.